United States Patent
Luo et al.

(10) Patent No.: US 7,636,479 B2
(45) Date of Patent: Dec. 22, 2009

(54) METHOD AND APPARATUS FOR CONTROLLING CLASSIFICATION AND CLASSIFICATION SWITCHING IN A VISION SYSTEM

(75) Inventors: Yun Luo, Livonia, MI (US); Farid Khairallah, Farmington Hills, MI (US); Jon K. Wallace, Redford, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 1031 days.

(21) Appl. No.: 10/785,920

(22) Filed: Feb. 24, 2004

(65) Prior Publication Data

US 2005/0185846 A1   Aug. 25, 2005

(51) Int. Cl.
  *G06K 9/62* (2006.01)
(52) U.S. Cl. ............... 382/224; 382/103; 382/104; 701/45; 701/49
(58) Field of Classification Search ......... 177/144; 180/271, 273, 282; 280/734, 735; 382/103, 382/104, 224; 701/45, 46, 49
See application file for complete search history.

(56) References Cited

U.S. PATENT DOCUMENTS

| | | | |
|---|---|---|---|
| 5,330,226 A | | 7/1994 | Gentry et al. |
| 5,528,698 A | * | 6/1996 | Kamei et al. ............... 382/100 |
| 5,785,347 A | * | 7/1998 | Adolph et al. .............. 280/735 |
| 6,246,936 B1 | | 6/2001 | Murphy et al. |
| 6,459,974 B1 | | 10/2002 | Baloch et al. |
| 6,549,658 B1 | | 4/2003 | Schweid et al. |
| 6,722,462 B2 | * | 4/2004 | Ikegami ..................... 180/282 |
| 6,784,379 B2 | * | 8/2004 | Breed et al. ................ 177/144 |
| 6,801,662 B1 | * | 10/2004 | Owechko et al. ........... 382/224 |
| 6,944,527 B2 | * | 9/2005 | Dell' Eva et al. ............ 701/45 |
| 2003/0031345 A1 | | 2/2003 | Farmer |
| 2003/0040859 A1 | | 2/2003 | Farmer |
| 2003/0204384 A1 | * | 10/2003 | Owechko et al. ............... 703/1 |
| 2003/0209893 A1 | | 11/2003 | Breed et al. |
| 2003/0234519 A1 | * | 12/2003 | Farmer ..................... 280/728.1 |

(Continued)

FOREIGN PATENT DOCUMENTS

EP   1 278 159 A2   1/2003

(Continued)

OTHER PUBLICATIONS

"Automatic Font Selection for Character Recognition", *IBM Technical Disclosure Bulletin*, IBM Corp., New York, US, vol. 30, No. 3, Aug. 1, 1987, pp. 1112-1114, XP002009135.

(Continued)

*Primary Examiner*—Gregory M Desire
(74) *Attorney, Agent, or Firm*—Tarolli, Sundheim, Covell & Tummino LLP (57) ABSTRACT

A system for classifying image data includes a vision system (58) for continuously imaging an area (42) of interest and providing an image signals. A classifier (84) determines an image class corresponding to each image signal, determines a confidence level for each determined image class, determines a time period for the confidence level, and establishes an image classification in response thereto. Switching between image classifications is in response to the confidence level and time period of the confidence level. When used in a vehicle restraining system (20), other monitor vehicle parameters (54) can be used to adjust the confidence levels and time periods needed to switch between image classifications.

15 Claims, 5 Drawing Sheets

U.S. PATENT DOCUMENTS

| | | | |
|---|---|---|---|
| 2004/0045758 A1 | 3/2004 | Breed et al. | |
| 2004/0220705 A1* | 11/2004 | Basir et al. | 701/1 |
| 2004/0234136 A1* | 11/2004 | Zhu et al. | 382/224 |
| 2005/0175243 A1* | 8/2005 | Luo et al. | 382/224 |
| 2005/0185846 A1* | 8/2005 | Luo et al. | 382/224 |
| 2005/0201591 A1* | 9/2005 | Kiselewich | 382/104 |
| 2005/0271280 A1* | 12/2005 | Farmer et al. | 382/224 |
| 2007/0055428 A1* | 3/2007 | Kong et al. | 701/45 |
| 2008/0240496 A1* | 10/2008 | Senior | 382/103 |

FOREIGN PATENT DOCUMENTS

| | | |
|---|---|---|
| WO | WO 02/30717 A1 | 4/2002 |
| WO | WO 03/089277 A1 | 10/2003 |

OTHER PUBLICATIONS

"Template Selection Method for Multi-Font Documents", *IBM Technical Disclosure Bulletin*, IBM Corp., New York, US, vol. 32, No. 4A, Sep. 1, 1989, pp. 268-270, XP000039950.

Otsu. "A Threhsold Selection Method from Gray-Level Histograms", *IEEE Transactions on Systems, Man and Cybernetics*, vol. 9, No. 1, 1979, pp. 62-66, XP000617438.

Cortes et al., "Support Vector Networks", *Machine Learning*, vol. 20, 1995, pp. 273-297, XP002386458.

\* cited by examiner

METHOD AND APPARATUS FOR CONTROLLING CLASSIFICATION AND CLASSIFICATION SWITCHING IN A VISION SYSTEM

TECHNICAL FIELD

The present invention is directed generally to vision system pattern recognition classifiers and is particularly directed to a method and apparatus for controlling classification and classification switching in vision systems having a statistical classifier to provide a robust pattern classification arrangement that is particularly useful in occupant restraint systems for object and/or occupant classification.

BACKGROUND OF THE INVENTION

Actuatable occupant restraining systems having an inflatable air bag in vehicles are known in the art. Such systems that are controlled in response to whether the seat is empty or occupied, whether a rearward facing child seat ("RFCS") is present on the seat, and/or in response to the occupant's position, weight, size, etc., are referred to as smart restraining systems. One example of a smart actuatable restraining system is disclosed in U.S. Pat. No. 5,330,226.

Pattern recognition systems may be defined as systems capable of distinguishing between classes of real world stimuli according to a plurality of distinguishing characteristics, or features, associated with the classes. A number of pattern recognition systems that use vision system inputs are known in the art, including statistical classifiers such as neural networks and support vector machines. Support vector machines are described by Vladimir Vapnik [C. Cortes and V. Vapnik, in "Support Vector Networks," *Machine Learning*, Vol. 20, pp. 273-97, 1995].

Support vector machines are intelligent systems that generate appropriate separating functions for a plurality of output classes from a set of training data. The separating functions divide an N-dimensional feature space into portions associated with the respective output classes, where each dimension is defined by a feature used for classification. Once the separators have been established, future input to the system can be classified according to its location in feature space (e.g., its value for N features) relative to the separators. In its simplest form, a support vector machine distinguishes between two output classes, a "positive" class and a "negative" class, with the feature space segmented by the separators into regions representing the two alternatives.

SUMMARY OF THE INVENTION

In accordance with an exemplary embodiment of the present invention, classification of image data is responsive to image confidence levels and time periods of the confidence levels. Switching of an image classification from one image class to another image class is permitted in response to image confidence levels and time periods of the confidence levels. The confidence levels and confidence level time periods required to permit class switching may be adjusted in response to sensed vehicle operations such as door opening conditions, vehicle ignition operating conditions, or vehicle speed.

In accordance with an exemplary embodiment of the present invention, a system for classifying image data comprises a vision system for imaging an area of interest and providing image signals over time. The system further includes a classifier for determining an image class corresponding to each image signal, determining a confidence level for each determined image class, determining a time period of a determined image class at a determined confidence level, and establishing an image classification in response to the determined confidence level and time period.

In accordance with another exemplary embodiment of the present invention, a method is provided for classifying image data comprising the steps of imaging an area of interest and providing image signals, determining an image class corresponding to each image signal, determining a confidence level for each determined image class, determining a time period of a determined image class at a determined confidence level, and establishing an image classification in response to the determined confidence level and time period.

In accordance with yet another embodiment of the present invention, a method for controlling classification of image data comprises the steps of imaging an area of interest, classifying the image as one of a plurality of possible classes, and filtering the classification of image data in response to a characteristic of the classification.

In accordance with a preferred embodiment of the present invention, class switching is controlled in response to an image class determination having a confidence level exceeding a predetermined confidence switching level threshold and confidence level time period exceeding a predetermined switching time period threshold. Vehicle operating conditions can be used to adjust the confidence switching level threshold and the switching time period threshold.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF PREFERRED EMBODIMENT

Figure 1:
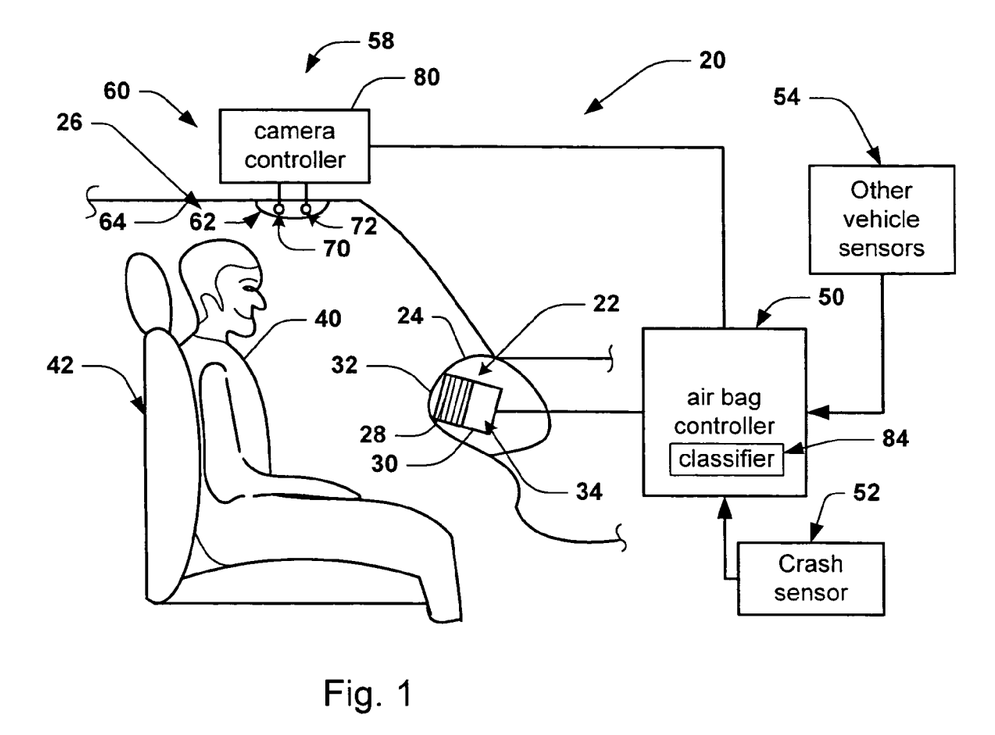
FIG. 1 is a schematic illustration of an actuatable restraining system in accordance with an exemplary embodiment of the present invention for imaging a vehicle interior area.

Referring to FIG. 1, an exemplary embodiment of an actuatable occupant restraint system 20, in accordance with the present invention, includes an air bag assembly 22 mounted in an opening of a dashboard or instrument panel 24 of a vehicle 26. The air bag assembly 22 includes an air bag 28 folded and stored within the interior of an air bag housing 30. A cover 32 covers the stored air bag and is adapted to open easily upon inflation of the air bag 28.

The air bag assembly 22 further includes a gas control portion 34 that is operatively coupled to the air bag 28. The gas control portion 34 may include a plurality of gas sources (not shown) and vent valves (not shown) for, when individually controlled, controlling the air bag inflation, e.g., timing, gas flow, bag profile as a function of time, gas pressure, etc. Once inflated, the air bag 28 may help protect an occupant 40, such as a vehicle passenger, sitting on a vehicle seat 42 during a vehicle collision or roll-over event, generally referred to herein as a deployment event, i.e., an event in which it may be desirable to deploy the air bag 28. Although the embodiment of FIG. 1 is described with regard to a vehicle passenger seat location, the invention is also applicable to a vehicle driver seat location and back seat locations and to their associated actuatable restraining systems. The present invention is also applicable to the control of front, side, and rear actuatable restraining devices and to the control of actuatable restraining devices deployable in response to rollover events.

An air bag controller 50 is operatively connected to the air bag assembly 22 to control the gas control portion 34 and, in turn, inflation of the air bag 28. The air bag controller 50 can take any of several forms such as a microcomputer, discrete circuitry, an application-specific-integrated-circuit ("ASIC"), etc. The controller 50 is further connected to a deployment event sensor such as a crash sensor 52. The crash sensor 52 can take any of several forms such as one or more vehicle crash accelerometers or other crash detection devices. Other vehicle sensors 54 such as a vehicle ignition sensor, door open condition sensor, and vehicle speed sensor are also connected to the air bag controller 50. The controller 50 monitors the output signal(s) from the crash sensor 52 and, in accordance with a deployment control algorithm using an event or crash analysis algorithm, determines if a deployment event is occurring, i.e., one for which it may be desirable to deploy the air bag 28. There are several known event or crash analysis algorithms responsive to crash acceleration signal(s) that may be used as part of the present invention. There are also other deployment control algorithms such as roll-over determining algorithms that may be used with the present invention. Once the controller 50 determines that a deployment event is occurring using a selected deployment control and analysis algorithm, and if certain other conditions are satisfied, the controller 50 controls inflation of the air bag 28 using the gas control portion 34, e.g., timing, gas flow rate, gas pressure, bag profile as a function of time, etc.

The air bag restraining system 20, in accordance with the present invention, further includes an imaging system 58 including a stereo-vision assembly 60. The stereo-vision assembly 60 includes stereo-cameras 62 preferably mounted to the headliner 64 of the vehicle 26. Other mounting arrangements of the stereo cameras can be used.

The stereo-vision assembly 60 includes a first camera 70 and a second camera 72, both connected to a camera controller 80. In accordance with one exemplary embodiment of the present invention, the cameras 70, 72 are spaced apart by approximately 35 millimeters ("mm"), although other spacing can be used. The cameras 70, 72 are positioned substantially in parallel with the front-to-rear axis of the vehicle 26, although other relative orientations of the cameras are possible.

The camera controller 80 can take any of several forms such as a microcomputer, discrete circuitry, ASIC, etc. The camera controller 80 is connected to the air bag controller 50 and provides an image signal to the air bag controller 50 having image data relating to various characteristics of what is present on the occupant seat 42. There is an infinite possibility of objects that may be present on the occupant seat 42 ranging from an empty seat to any given object including an occupant 40. The present invention is particularly directed to distinguishing between a finite set of classes of possible objects that may be on the occupant seat 42 including the possibility of an empty seat class.

The air bag control algorithm associated with the controller 50 can be made to respond to the provided image data from the camera controller 80. For example, if the provided image data indicates that an object is present on the occupant seat 42 and that the object is a shopping bag and not a human being, actuating the air bag by the controller 50 in a deployment event serves no purpose. In such a case, the controller 50 would disable the air bag assembly.

The controller 50 is arranged to respond to the image data, determine the classification of the object on the occupant seat, including an empty seat class, and control the air bag assembly in response thereto during a deployment event. In accordance with the present invention, the air bag controller 50 includes a pattern recognition classifier portion 84 operative to distinguish between a plurality of occupant classes based on the image data provided by the camera controller 80 and other vehicle sensor inputs from sensors 54. Any known classification scheme may be used to determine which one of a plurality of classes each image belongs.

Figure 2:
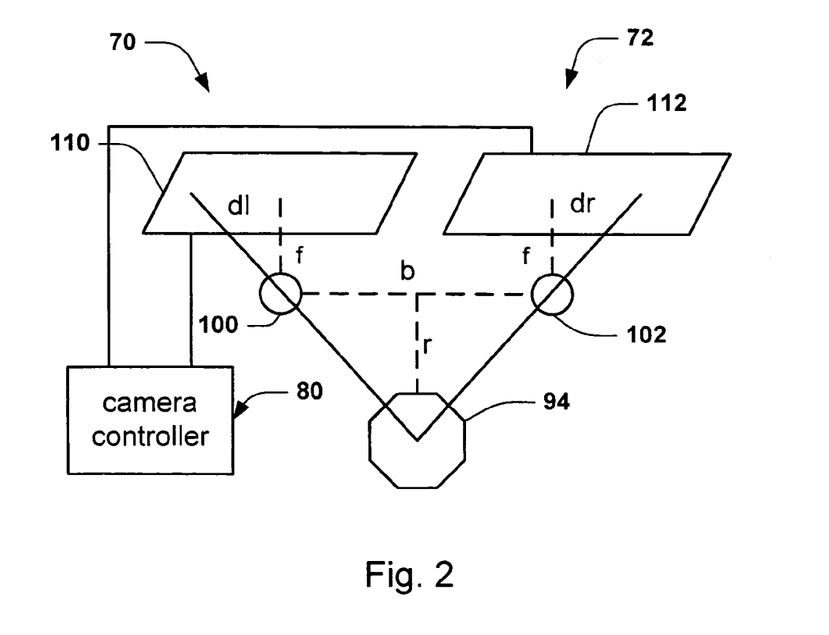
FIG. 2 is a schematic illustration of a stereo camera arrangement for use with the present invention for imaging a vehicle interior area.

Referring to FIG. 2, the cameras 70, 72 may be of any several known types. In accordance with one exemplary embodiment, the cameras 70, 72 are charge-coupled devices ("CCD") or complementary metal-oxide semiconductor ("CMOS") devices. The output of the two camera devices can be combined to provide three-dimension information about an imaged subject 94 as a stereo disparity map. Since the cameras are at different viewpoints, each camera sees the subject at an associated different position. The image difference is referred to as "disparity." To get a proper disparity determination, it is desirable for the cameras to be positioned and set up so that the subject 94 to be monitored is within the horopter of the cameras.

The subject 94 is viewed by the two cameras 70, 72. Since the cameras 70, 72 "see" the subject 94 from different viewpoints, two different images are formed on the associated pixel arrays 110, 112, of cameras 70, 72, respectively. The distance between the viewpoints or camera lenses 100, 102 is designated "b". The focal length of the lenses 100 and 102 of the cameras 70 and 72, respectively, is designated as "f". The horizontal distance from the image center on the CCD or CMOS pixel array 110 and a given pixel representing a portion of the subject 94 on the pixel array 110 of camera 70 is designated "dl" (for the left image distance). The horizontal distance from the image center on the CCD or CMOS pixel array 112 and a given pixel representing a portion of the subject 94 on the pixel array 112 for the camera 72 is designated "dr" (for the right image distance). Preferably, the cameras 70, 72 are mounted so that they are in the same image plane. The difference between dl and dr is referred to as the image disparity. The analysis can be performed pixel by pixel for the two pixel arrays 110, 112 to generate a stereo disparity map of the imaged subject 94, wherein a given point on the subject 94 can be represented by x and y coordinates associated with the pixel arrays and an associated disparity value.

Each disparity image is processed by the classifier portion 84 of the controller 50 using a statistical classifier. Any known classifier scheme may be used to classify each image as one of a plurality of possible classes. The classifier 84 determines if the image indicates if the seat is empty or occupied. The seat being empty is one class condition and the seat being occupied is another class condition. If the seat is occupied, the classifier 84 determines which one of a plurality of possible occupancy classes the object belongs. For example, in an active control restraining system, it is useful to classify objects on the seat 42 as an adult, a child, a reward facing child seat ("RFCS") or forward facing child seat ("FFCS"). Other occupancy classes are possible, these four given for example and explanation purposes only. Based on the whether the seat is empty or occupied (one of two main classes) and which particular occupancy class (an adult, a child, RFCS, or FFCS), as determined by the classifier portion 84, the controller 50 controls the air bag 22 differently during a deployment event. For example, if a RFCS is determined to be present during a forward crash event that would be an otherwise deployment crash event, the air bag 28 may be prevented from being activated.

For two-dimensional applications, the images can be acquired using known digital imaging techniques. Three-dimensional image data can be provided via the stereo camera 62 as a stereo disparity map. The Otsu algorithm [Nobuyuki Otsu, "A Threshold Selection Method from Gray-Level Histograms," IEEE Transactions on Systems, Man, and Cybernetics, Vol. 9, No. 1, pp. 62-66, 1979] can be used to obtain a binary image of an object with the assumption that a given subject of interest is close to the camera system. The stereo images are processed in pairs and the disparity map is calculated to derive 3D information about the image.

Image preprocessing is also preferably accomplished prior to determination of the disparity image. Background information and noise are removed from the acquired images either at the camera controller 80, the air bag controller 50 or processing circuitry (not shown) functionally located between camera controller 80 and air bag controller 50. The images can also be processed to better emphasize desired image features and maximize the contrast between structures in the images. For example, a contrast limited adaptive histogram equalization ("CLAHE") process can be applied to adjust each image for lighting conditions based on an adaptive equalization algorithm. The CLAHE process lessens the influence of saturation resulting from direct sunlight and low contrast dark regions caused by insufficient lighting. The CLAHE process subdivides an image into contextual regions and applies a histogram-based equalization to each region. The equalization process distributes the grayscale values in each region across a wider range to accentuate the contrast between structures within the region. This can eliminate regions of limited contrast (e.g., regions of saturation or low illumination) and reveal otherwise indiscernible structures within the low contrast regions.

Image classification can be accomplished using any known arbitration technique typically using an intelligent network. In an exemplary embodiment, the classifier function 84 can include a Support Vector Machine ("SVM") or a neural network ("NN") to classify the image into one of a plurality of possible output classes using confidence levels and a known arbitration scheme. It will be appreciated that the classifier 84 can comprise a plurality of individual intelligent classification systems united by an arbitration system that selects between or combines their outputs to make a determination of a single class based on the present image data.

A SVM classifier can analyze the feature vectors with respect to an N-dimensional feature space to determine regions of feature space associated with each class. Each of the N dimensions represents one associated feature of the feature vector. The SVM produces functions, referred to as hyperplanes, representing boundaries in the N-dimensional feature space. The boundaries define a range of feature values associated with each class, and future inputs can be classified according to their position with respect to the boundaries. One common feature with such intelligent classification functions is that each classification decision includes a confidence value associated with the classification decision.

In accordance with the present invention, once the classifier 84 has identified either an empty seat class or a particular occupancy class, the system must be robust to prevent improper classification switching in response to a temporary change in image data that, although, may give a temporary indication of a different class, is not, in fact, indicative of a true class change. For example, if a vehicle is traveling down the road at 40 MPH and the classifier has identified an object on the passenger seat as an adult, it is unlikely that such adult will suddenly morph into a RFCS. Assume that the classifier 84 has determined that the image data has indicated an adult class. The controller 50 would be set to control the air bag assembly 22, should a deployment event occur, for an adult passenger based on the adult class determination. Assume that because of a change in light condition, movement of the occupant, or other unusual condition, a single image data is transferred that indicates a RFCS. If the controller 50 were to switch control from that of an adult class to control corresponding to that commensurate with a RFCS, the controller 50 could disable the air bag assembly during such time period. While it is desirable to avoid such class switching for such temporary image data switches, if a real class change occurs, it is desirable for the classifier 84, and, in turn, the controller 50, to respond to the change.

Figure 3:
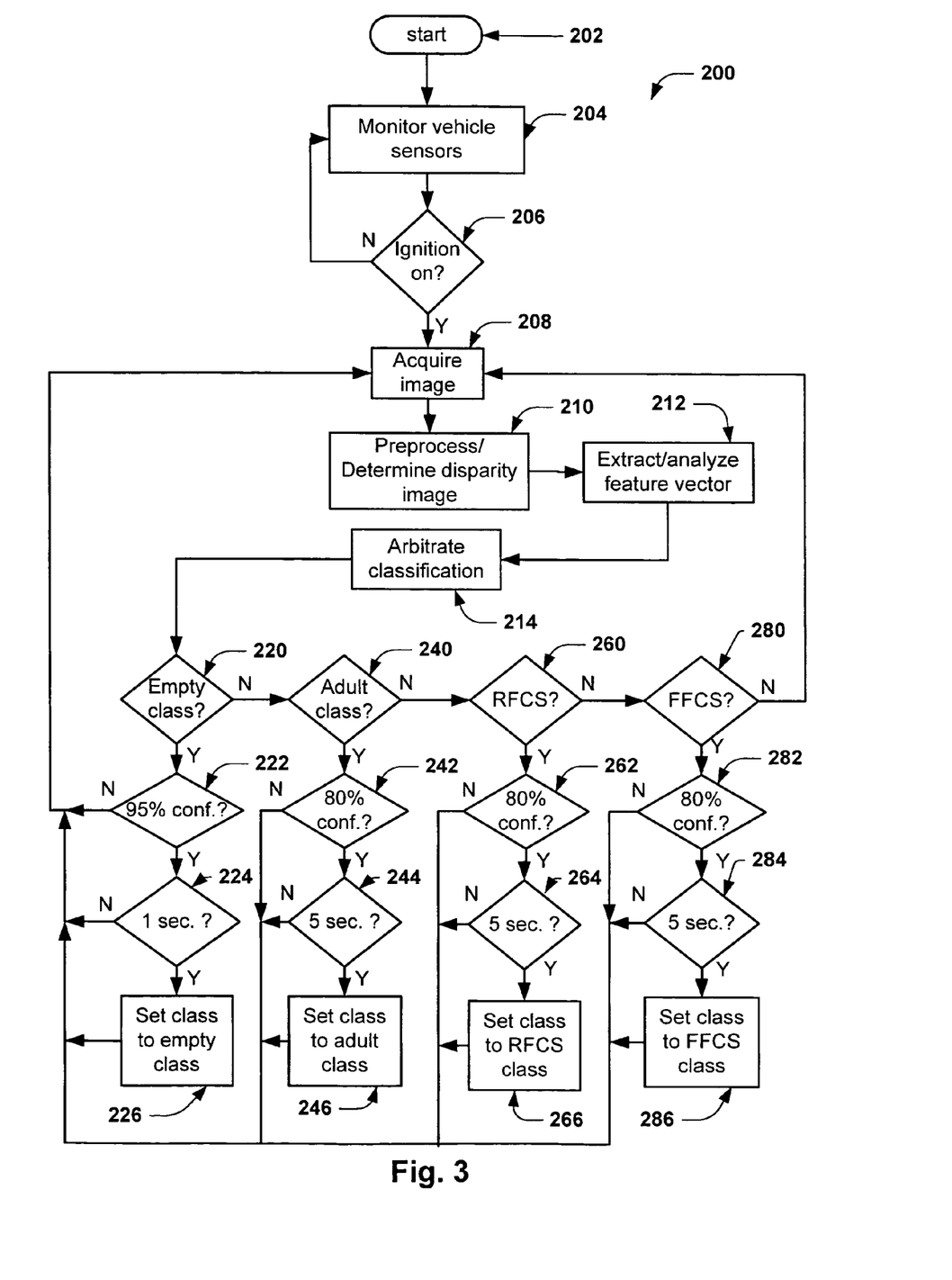
FIG. 3 is a flow chart showing a process for controlling classification and class switching in accordance with an exemplary embodiment of the present invention.

Referring to FIG. 3, a process 200 is shown for controlling classification and classification switching in accordance with an exemplary embodiment of the present invention by the classifier function 84. Although serial processing is shown, the flow chart is given for explanation purposes only and the order of the steps and the type of processing can vary from that shown.

The process is initialized at step 202, in which internal memories are cleared, initial flag conditions are set, etc. An initial or default occupancy class may set at this step if desired. At step 204, the controller 50 monitors the other vehicle sensor inputs from sensors 54. One of the monitored vehicle inputs is the vehicle ignition condition. At step 206, a determination is made as to whether the vehicle ignition is ON. If the determination is negative, the process loops back to step 204. If the determination in step 206 is affirmative, the process acquires images in step 208. As mentioned, the seat 42 can be empty or can have any item, including an occupant, on the seat. If any object is on the seat, the seat is considered as having an occupancy state. If the seat is empty, it is considered as being in an empty state.

The input image can be a two or three-dimension image of the interior of the vehicle 26 acquired by the cameras 70, 72. For two-dimensional applications, the image can be acquired by either of the cameras 70, 72 using known digital imaging techniques.

Three-dimensional image data can be provided via the cameras 70, 72 as a stereo disparity map. The Otsu algorithm [Nobuyuki Otsu, "A Threshold Selection Method from Gray-Level Histograms," IEEE Transactions on Systems, Man, and Cybernetics, Vol. 9, No. 1, pp. 62-66, 1979] can be used to obtain a binary image of an object with the assumption that a given subject of interest is close to the camera system. The stereo images are processed in pairs and the disparity map is calculated to derive 3D information about the image.

The acquired image is preprocessed in step 210 to remove background information and noise. The image can also be processed to better emphasize desired image features and maximize the contrast between structures in the image. For example, a contrast limited adaptive histogram equalization (CLAHE) process can be applied to adjust the image for lighting conditions based on an adaptive equalization algorithm. The CLAHE process lessens the influence of saturation resulting from direct sunlight and low contrast dark regions caused by insufficient lighting. The CLAHE process subdivides the image into contextual regions and applies a histogram-based equalization to each region. The equalization process distributes the grayscale values in each region across a wider range to accentuate the contrast between structures within the region. This can make otherwise hidden features of the image more visible. Also in step 210, the disparity image is determined.

At step 212, feature data is extracted from the input image in the form of a feature vector. A feature vector represents an image as a plurality of elements representing features of interest within the image. Each element can assume a value corresponding to a quantifiable image feature. It will be appreciated the image features can include any quantifiable features associated with the image that are useful in distinguishing among the plurality of output classes. Exemplary features can include the average brightness within one or more selected regions of the image, the variance of the grayscale values of the pixels comprising one or more selected regions within the image, and a coarseness measure of one or more selected regions of the image. A pattern recognition classifier implemented as a support vector machine can process data extracted from associated training images to produce functions representing boundaries in a feature space defined by the various features of interest. The bounded region for each class defines a range of feature values associated with each of the plurality of classes. The location of the feature vector representing the input image with respect to these boundaries can be used to determine the class membership of the input image.

The classifier 84 can be implemented as any of a number of intelligent systems such as a statistical classifier suitable for classifying an input image. In an exemplary embodiment, the classifier 84 can utilize one of a Support Vector Machine ("SVM") algorithm or an artificial neural network ("ANN") learning algorithm to classify the image into one of a plurality of output classes.

A SVM classifier can utilize a plurality of functions, referred to as hyperplanes, to conceptually divide boundaries in the N-dimensional feature space, where each of the N dimensions represents one associated feature of the feature vector. The boundaries define a range of feature values associated with each class. Accordingly, an output class can be determined for a given input feature vector according to its position in feature space relative to the boundaries.

An ANN classifier comprises a plurality of nodes having a plurality of interconnections. The values from the feature vector are provided to a plurality of input nodes. The input nodes each provide these input values to layers of one or more intermediate nodes. A given intermediate node receives one or more output values from previous nodes. The received values are weighted according to a series of weights established during the training of the classifier. An intermediate node translates its received values into a single output according to a transfer function at the node. For example, the intermediate node can sum the received values and subject the sum to a binary step function.

The training process of the classifier 84 will vary with its implementation, but the training generally involves a statistical aggregation of training data from a plurality of training images into one or more parameters associated with the output class. For example, a SVM classifier can process the training data to produce functions representing boundaries in a feature space defined by the various attributes of interest. Similarly, an ANN classifier can process the training data to determine a set of interconnection weights corresponding to the interconnections between nodes in its associated the neural network.

In accordance with the present invention, each image can be classified into one of a plurality of finite possible classes such as an empty seat class, an adult class, a child class, a RFCS class, or a FFCS class. These classes are given only for example and explanation purposes and classes can be less or more and can be different from those listed. The classifier 84 preferably includes a plurality of separate classifiers each of which process the image data and determine if the image data belongs to its class. Any known arbitration scheme may be used with the present invention to resolve image into a single class determination which is represented by the arbitration step 214. From, step 214, a classification result will be provided for each image data as to which class the image data indicates.

As mentioned, any known scheme can be used to process image data into classes so that each image results in a class determination. The use of support vector machines and neural networks discussed above are presented as possible examples. Those skilled in the art will appreciate that although class determinations are made for each image data received, the controller 50 does not accept that class as the object class. The controller 50, via the process 200 monitors the image class determinations over time and determines an image classification based upon a confidence value and confidence time period as described below.

A determination is made in step 220 as to whether the image data class indicates that the seat 42 is empty. If the determination in step 220 is affirmative, a determination is made in step 222 as to whether the determination in step 220 has a 95% confidence level or higher. The confidence level of the determination in step 222 is based on the number of empty class determinations made over a predetermined number of last determinations made. For example, if nine out of the last ten image data classifications resulted in an empty seat classification determination, the confidence level would be nine out of ten or 90%.

If the determination in step 222 is affirmative, a determination is made in step 224 as to whether there has been a determination of an empty seat condition with at least a 95% confidence value has existed for at least one second. If the determination in step 224 is affirmative, the class is set to an empty seat class in step 226 and the process loops back to step 208 where further images are obtained and processed.

If an empty seat class is determined in step 220 but either not with a 95% confidence level (determination 222 is negative) or higher or not with at least a 95% confidence level for at least 1 second (determination 224 is negative), the process loops back to step 208 and more images are monitored until a class can be determined. If the determination in step 220 is negative, the process proceeds to step 240.

A determination is made in step 240 as to whether the image data indicates that the seat 42 is occupied by an adult. If the determination in step 240 is affirmative, a determination is made in step 242 as to whether the determination in step 240 has an 80% confidence level or higher. The confidence level of the determination in step 242 is based on the number of adult class determinations made over a predetermined number of last determinations made. For example, if eight out of the last ten image data classifications resulted in an adult classification determination, the confidence level would be eight out of ten or 80%.

If the determination in step 242 is affirmative, a determination is made in step 244 as to whether there has been a determination of an adult class with at least an 80% confidence value lasted for at least five seconds. If the determination in step 244 is affirmative, the class is set to an adult class in step 246 and the process loops back to step 208 where further images are taken and processed.

If an adult class is determined in step 240 but either not with an 80% confidence level (step 242 is negative) or higher or not with at least an 80% confidence level for at least five seconds (step 244 is negative), the process loops back to step 208 and more images are monitored until a class can be determined. If the determination in step 240 is negative, the process proceeds to step 260.

A determination is made in step 260 as to whether the image data indicates that the seat 42 is occupied by a RFCS. If the determination in step 260 is affirmative, a determination is made in step 262 as to whether the determination in step 260 has an 80% confidence level or higher. The confidence level of the determination in step 262 is based on the number of RFCS class determinations made over a predetermined number of last determinations made. For example, if eight out of the last ten image data classifications resulted in an RFCS classification determination, the confidence level would be eight out of ten or 80%.

If the determination in step 262 is affirmative, a determination is made in step 264 as to whether there has been a determination of a RFCS class with at least an 80% confidence value has lasted for at least five seconds. If the determination in step 264 is affirmative, the class is set to a RFCS class in step 266 and the process loops back to step 208 where further images are taken and processed.

If a RFCS class is determined in step 260 but either not with an 80% confidence level (step 262 is negative) or higher or not with at least an 80% confidence level for at least five seconds (step 264 is negative), the process loops back to step 208 and more images are monitored until a class can be determined. If the determination in step 260 is negative, the process proceeds to step 280.

A determination is made in step 280 as to whether the image data indicates that the seat 42 is occupied by a FFCS. If the determination in step 280 is affirmative, a determination is made in step 282 as to whether the determination in step 280 has an 80% confidence level or higher. The confidence level of the determination in step 282 is based on the number of FFCS class determinations made over a predetermined number of last determinations made. For example, if eight out of the last ten image data classifications resulted in an FFCS classification determination, the confidence level would be eight out of ten or 80%.

If the determination in step 282 is affirmative, a determination is made in step 284 as to whether there has been a determination of a FFCS class with at least an 80% confidence value for at least five seconds. If the determination in step 284 is affirmative, the class is set to a FFCS class in step 286 and the process loops back to step 208 where further images are taken and processed.

If a FFCS class is determined in step 280 but either not with an 80% confidence level (step 282 is negative) or higher or not with at least an 80% confidence level for at least five seconds (step 284 is negative), the process loops back to step 208 and more images are monitored until a class can be determined. If the determination in step 280 is negative, the process loops back to step 208.

The child class mentioned as one of the possible plurality of finite classes for an occupant restraint system in accordance with the present invention is not specifically shown in FIG. 3. Those skilled in the art will appreciate that its class determination and control is similar to any of the occupancy classes shown therein.

Once a class is set in steps 226, 246, 266, or 286, the controller 50 sets internal flags and registers so as to control the air bag accordingly should a deployment condition of the air bag assembly occur as is well known in the art. For example, as mention, if a RFCS is detected on the front occupant seat 42, it may not be desirable to deploy the frontal air bag 28 during a frontal crash event in that such deployment would not aid in protection. Also, if an empty seat class is determined, it is not desirable to deploy the air bag during a vehicle crash event since such deployment would not be beneficial. Any know specific control based on the known occupancy condition of the vehicle occupant seat can be used with the present invention. These contemplated controls range from complete disabling of the air bag during a deployment event to the control of timing and amount of gas used during deployment.

Once the classifier sets the class in accordance with an exemplary embodiment of the present invention, the process shown in FIG. 3 continues to process images and permits class switching under certain conditions also in accordance with an exemplary embodiment of the present invention. In accordance with the present invention, once a class is determined (or from the initial set class in step 202), the class condition is locked onto the determined class until and unless a new class condition is determined with a certain degree of confidence and for a certain continuous time period. This is referred to herein as the confidence/time switching filter. In accordance with the present invention, the longer a class condition remains in a steady state, i.e., the longer a class remains in an uninterrupted state, the degree of class confidence and the time period a new class must exist before a class state can switch can be increased. Factors of the vehicle may also be used to alter the time periods and confidence levels needed to allow class switching such as vehicle speed, vehicle ignition condition, vehicle door opening condition, etc.

Assume that an empty seat is set as the class in step 226, i.e., an empty seat class. Once the class is set to the empty seat class, it is locked onto that class. Being locked does not mean that it is impossible to switch to another class, it simply means that certain criteria must be met before the classifier 84 will permit the classification to switch to another class. Further, in this example, assume that image data beginning at some time $t_1$ provides an indication of a RFCS class with only a 50% confidence level. Since step 262 would not be answered affirmatively, the class would not be switched in step 266 because the process, in this example, would not enter step 266. Even though an affirmative RFCS from step 260 would occur in this example, if the confidence level is not 80% or higher and is not at least 80% for 5 seconds, the class would not be switched to RFCS. If however, starting at time $t_1$ there was a RFCS determination with at least an 80% confidence level (an affirmative determination in step 262) for 5 seconds (an affirmative determination in step 262), the class would be switched to RFCS in step 266 and the controller 50 would adjust control of the air bag accordingly.

As should be appreciated by those skilled in the art, according to this process, once a class determination is made having a certain confidence level for a certain time period, the class is locked until a new class determination is made having a predetermined confidence level for a predetermined time period. The classification state is therefore filtered in response to a characteristic (confidence and time of the classification).

Figure 4:
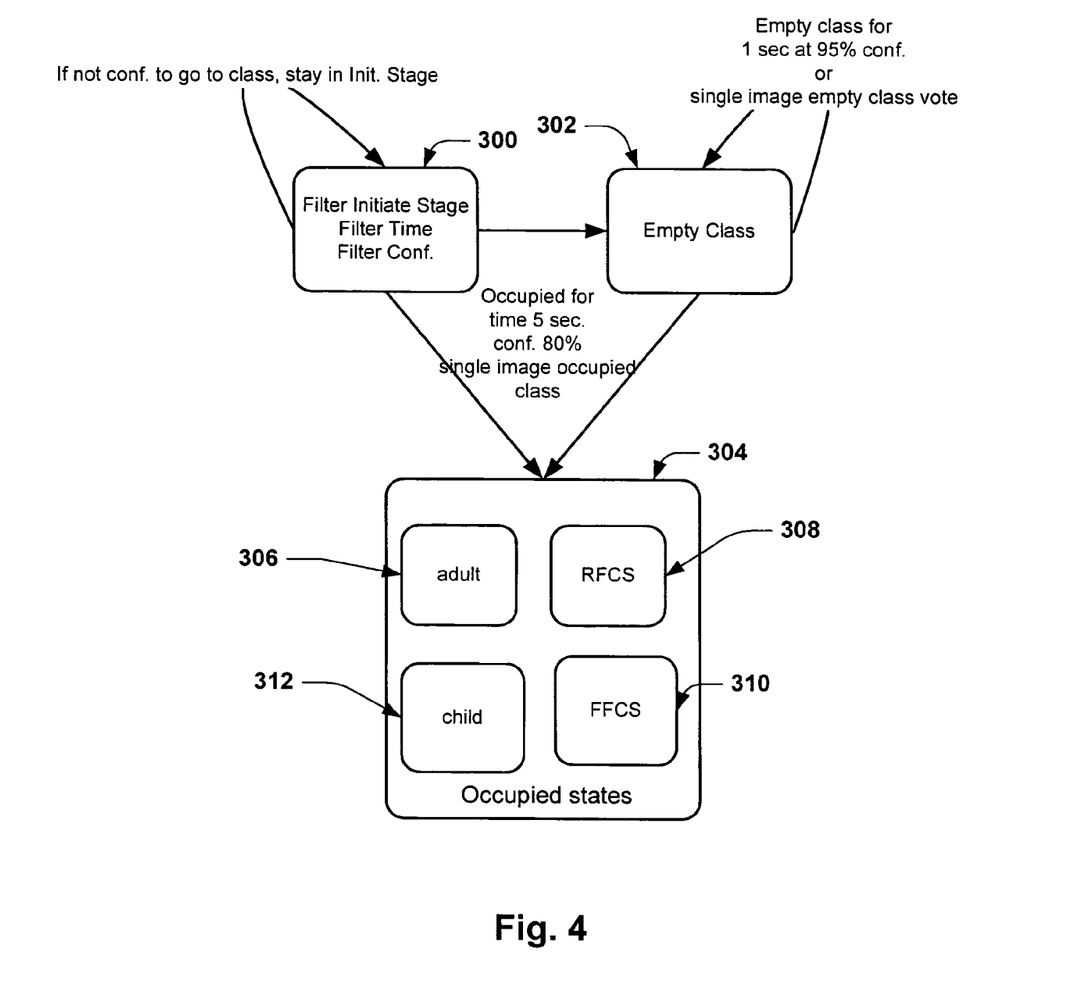
FIG. 4 is a state diagram showing a process for controlling classification and class switching in accordance with an exemplary embodiment of the present invention.

Referring to FIG. 4, a state diagram shows the control process of the present invention similar to that depicted in the flow chart of FIG. 3 but in a different form. Starting at step 300, there is an initial time/confidence filter before any class is determined based on images acquired from the imaging system within the vehicle. If the intelligent classification system does not determine some classification with a minimum confidence level for a minimum time period, no class is set or output from the classifier 84 but the system stays in an initial set condition. The initial set condition can be any of the plurality of possible classes such an empty seat class. This initial class setting can also be referred to as the default class setting.

If an empty seat class is determined with a 95% confidence level or higher for a minimum of one second, the class is set at step 302 to the empty class condition. If one of the occupancy classes is determined with an 80% confidence level or higher for a minimum of five seconds, the class is set to the particular occupancy class in step 304. Within the occupancy step 304, the specific adult class at step 306, the RFCS class at step 308, the FFCS class at step 310, or the child class at step 312 may be set.

Once a class is set, class switching is also subject to the same confidence/time prerequisites. It should be apparent from the diagram that the class can switch from an empty class to an occupancy class or from an occupancy class to an empty class only after both the time and confidence criteria are met for switching.

Figure 5:
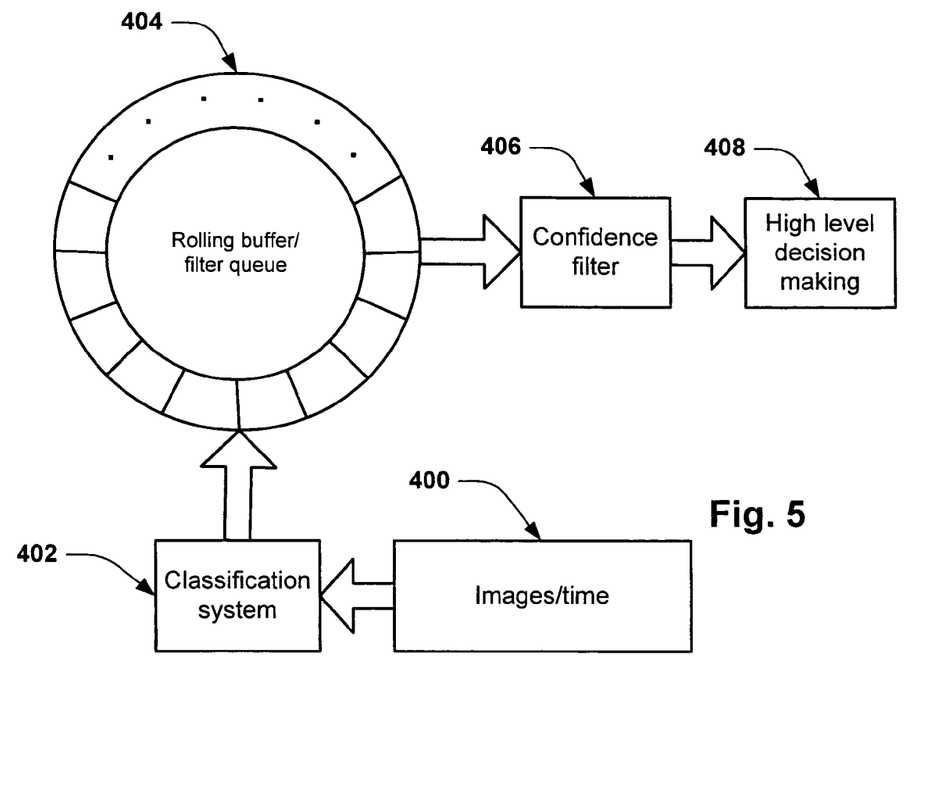
FIG. 5 is schematic arrangement showing a time/confidence filter for class switching control in accordance with the present invention.

Referring to FIG. 5, shows another schematic diagram depicting the time/confidence class switching control in accordance with an exemplary embodiment of the present invention. Individual images are continuously taken over time at 400 via the vision system 58 shown in FIG. 1. The individual images are input and analyzed by the classification system at 402. The classification system performs the process of making the initial determination as to which one of a plurality of possible classes the image data belongs. The class determination for each image is then placed into a rolling buffer or filter queue 404. A confidence filter 406 monitors the stored classes in the rolling buffer 404 and determines and monitors the present class and the confidence of the class over a predetermined number of latest determinations, e.g., over the last 20 class determinations. Based on the time period and confidence level of the class determination, a high level or final class determination is made at 408 as to the output class used by the controller 50 for further control of the restraining system. Once the class determination is made or from an initial set class, the class remains locked until a class condition for a predetermined time at a predetermined confidence level occurs that satisfies switching criteria.

As should be appreciated, the control arrangement in accordance with the present invention provides both a confidence level filter and a time filter to class switching. In accordance with another feature of the present invention, the time periods and the confidence levels needed in the initial setting of a class or those required to permit class switching can be dynamic, i.e., can be adjusted in response to certain vehicle operating parameters. These vehicle operating parameters may include, but are not limited to, the vehicle ignition condition (ON/OFF condition), door opening/closing condition, vehicle speed, etc.

Figure 6:
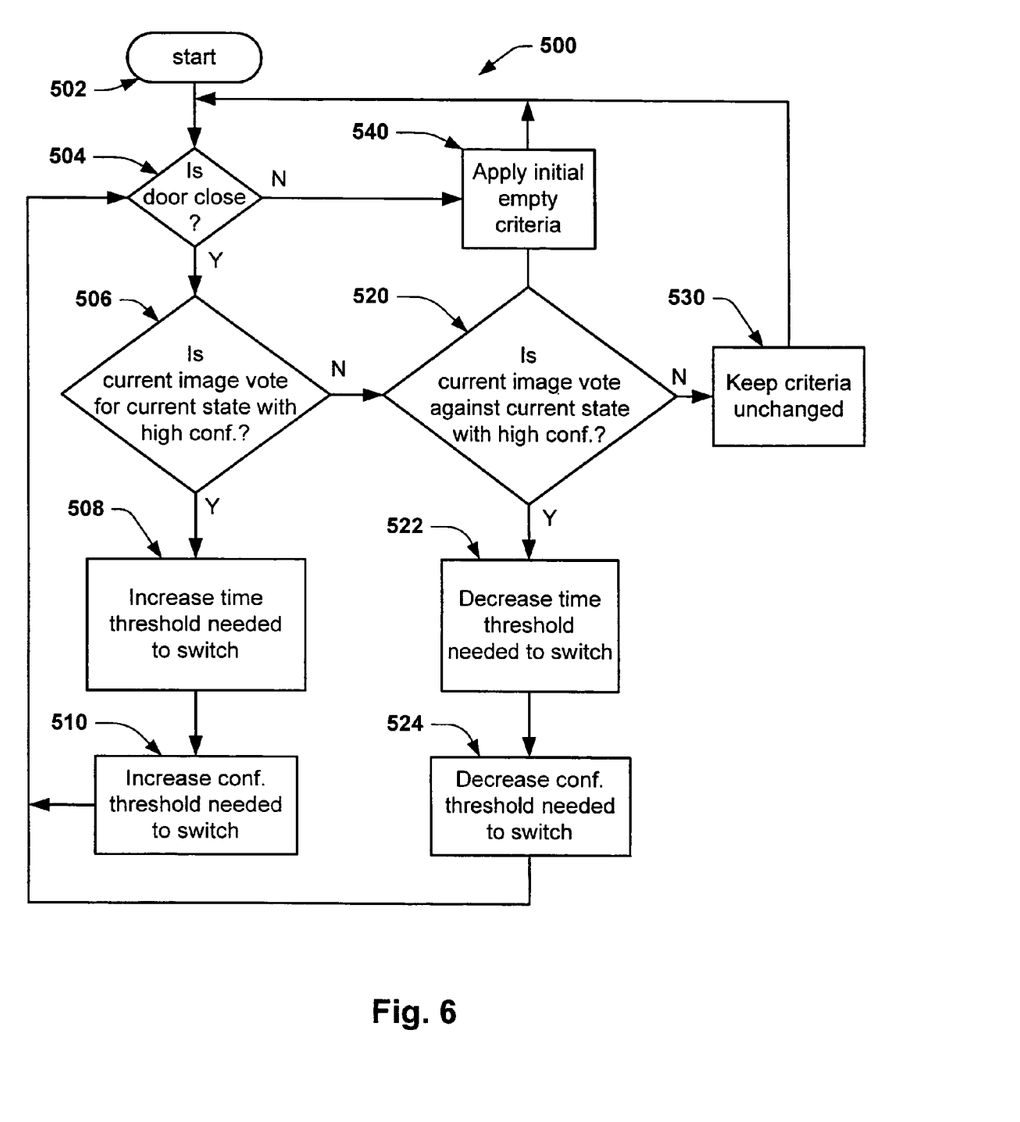
FIG. 6 is a flow diagram showing a process for adjusting switching control parameters in accordance with the present invention.

Referring to FIG. 6, one exemplary embodiment is shown of a process 500 for controlling switching criteria parameters. Although serial processing is shown, the flow chart is given for explanation purposes only and the order of the steps and the type of processing can vary from that shown. The process begins at step 502 and is continuously run along with the classification determination process. At step 502, the initial switch time and confidence levels criteria needed to switch a class are set. For example, the initial criteria needed to perform a class switch may be set to (1) at least a 95% confidence level for at least 1 second needed for an occupancy class to switch to an empty seat class, and (2) at least an 80% confidence level for at least 5 seconds needed for an empty seat class to switch to one of the occupancy seat classes or a switch to occur between occupancy classes shown in FIG. 3.

At step 504, the process monitors the vehicle door sensor from the vehicle sensors 54 and determines whether the vehicle door is closed. As mentioned, other vehicle sensors could be monitored and used in switching criteria (time and confidence level) control process such as vehicle speed, transmission state, etc. From an affirmative determination in step 504, a determination is made in step 506 as to whether the current image vote is for (i.e., the same as) the current classification state with a high level of confidence. An image vote for each class is simply the number of images for that class relative to a predetermined number of images. For example, assume that over the last 20 image classes, 20 were for an adult class. The current image vote would be for an adult class with 100% confidence. The image vote for the other classes would be 0%. Assume, that the door has remained closed (affirmative determination from step 504) and the last 20 out of 20 determinations has been the same class, then entering the determination in step 506, the confidence level would be 100%. The criteria for "high level of confidence" needed for an affirmative determination in step 506 can be, for example, set to be at least 98%. If the determination in step 506 is affirmative, the process increases the time level threshold needed before a switch can occur in step 508 and increases the confidence level threshold needed to make a switch in step 510. For example, assume that an adult class has been determined to be present on the seat. Further assume that the current image vote (19 out of the last 20 class determinations based on images) indicates an adult is present for a 95% confidence level (higher than the at least 80% required for the initial determination). In this example, the time and confidence level normally needed before a switch can occur (lets assume a switch to a RFCS) which may be at least 80% for at least 5 seconds (see FIG. 3) is raised to required at least an 85% confidence level for at least 7 seconds before a switch out of the adult class is permitted. From step 510, the process loops back to step 504. It is contemplated that time periods needed for switching may be extended as long as 60 seconds.

If the determination in step 506 is negative, meaning that the current image vote is not for the current state with a high degree of confidence, the process proceeds to step 520 where a determination is made as to whether the current image vote is against (i.e., not the same as) the current state with a high confidence level. For example, assume that the class was set as an adult class but the last 10 out of 20 determinations or 50% of image data results indicate a RFCS, there would be a high confidence that the current image vote (i.e., a RFCS) does not match the current state (i.e., and adult). If the determination in step 520 is affirmative, the process decreases the time level threshold needed before a switch can occur in step 522 and decreases the confidence level threshold needed to make a switch in step 524. For example, assume that an adult class has been determined to be present on the seat. Further assume that the current image vote (18 out of the last 20 class determinations based on images) indicates a RFCS is present. In this example, the time and confidence level normally needed before a switch can occur (lets assume a switch to a RFCS) which may be 80% for 5 seconds is lowered to required at least a 75% confidence level for at least 3 seconds before a switch out of the adult class is permitted. From step 524, the process loops back to step 504. The confidence value needed to have an affirmative determination in step 520 is selected to achieve a desired result.

From a negative determination in step 520, the process proceeds to step 530 where criteria standards remain unchanged and the process loops back to step 504.

From a negative determination in step 504, i.e., the door is opened, the initial empty seat criteria is reset in step 540. The empty seat criteria needed for switching is a predetermined confidence level threshold and time period threshold likely to catch a new seating class. The empty seat criteria can be the initial threshold conditions shown in FIG. 3. The process then loops back to step 504. One reason that sensing a door open condition is useful is that, if a door is opened, it is possible that a seating condition or a seating class is going to change. All criteria can be reset to initial condition on door opening and closing events, first time ignition ON conditions, etc. Similarly, it is unlikely that once the vehicle is running, or is at vehicle speed with the door closed that one type of class will morph into a different seating class. Therefore, once the door is closed and a class is determined with a high confidence for a consistent length of time, it is desirable to make class switching more difficult.

From the above description of the invention, those skilled in the art will perceive improvements, changes and modifications. Such improvements, changes and modifications within the skill of the art are intended to be covered by the appended claims.

Having described the invention, the following is claimed:

1. An occupant classification method for controlling an occupant protection device in a vehicle comprising the steps of:
   continuously imaging an area of interest within an interior of the vehicle at an associated imaging sensor and providing image signals;
   determining an image class corresponding to each image signal from a plurality of image classes;
   determining, for a predetermined time period, respective confidence levels for the plurality of image classes, the confidence level for a given class being defined as the percentage of image class determinations that match the image class out of a total number of image class determinations made during the predetermined time period;
   establishing an image classification in response to the determined confidence levels for the plurality of image classes, only if the confidence level associated with a given class over the predetermined time period exceeds a threshold value; and
   controlling the occupant protection device according to the established image classification.

2. The method of claim 1 further comprising the steps of:
   further monitoring the image signals;
   determining if a further monitored image signal indicates a different class;
   switching the established image classification to a new established image classification when a confidence level associated with an image class exceeds a switching confidence threshold for a switching time period.

3. The method of claim 1 wherein the system is used in a vehicle restraining system and further comprises the steps of:
   monitoring vehicle input signals;
   adjusting the switching time period and switching confidence threshold in response to said monitored vehicle input signals.

4. The method of claim 3 wherein said step of monitoring vehicle input signals includes monitoring an open condition of a vehicle door.

5. The method of claim 3 wherein said step of monitoring vehicle input signals includes monitoring a condition of the vehicle ignition.

6. The method of claim 1 wherein the step of imaging includes using a stereo camera.

7. The method of claim 1 wherein the step of imaging further includes the step of removing background information and noise from the image signal.

8. The method of claim 7 wherein the step of removing background information and noise includes applying a contrast limited adaptive histogram equalization that adjusts the image for lighting conditions.

9. The method of claim 1 wherein the step of determining an image class uses at least one of a support vector machine and a neural network.

10. A method for controlling an occupant protection device in a vehicle according to classification of image data comprising the steps of:
    imaging an area of interest within an interior of the vehicle at an image sensor and providing image data;
    classifying the image data as one of a plurality of image classes to provide an image classification;
    storing a predetermined number of image classifications over a first time period;
    assigning a confidence level to each image class according to the percentage of the predetermined number of image classifications in the first time period that represent the image class;
    assigning an image class to the area of interest only when the confidence level assigned to the image class exceeds a first threshold; and
    controlling the occupant protection device according to the established image classification.

11. The method of claim 10, further comprising switching the assigned image class for the area of interest when a confidence level greater than a second threshold is assigned to an image class, the second threshold being greater than the first threshold.

12. A system for classifying image data comprising:
    a vision system for continuously imaging an area of interest and providing image signals;
    a classifier that determines an image class corresponding to each image signal; and
    a confidence filter that determines a confidence level for each determined image class, the confidence filter determining a first confidence level for a first image class over a first time period and determining a second confidence level for a second image class over a second time period, and establishing an image classification for the area of interest as the first class if the first confidence level exceeds a first threshold and as the second class if the second confidence level exceeds a second threshold.

13. The system of claim 12, wherein the first time period is shorter than the second time period and the first confidence value is greater than the second confidence value.

14. A system for classifying image data associated with a vehicle occupant safety system into an associated one of a plurality of output classes, said system comprising:
    a vision system that images a vehicle interior to provide an image signal; and
    a classifier that determines an image class in response to a class confidence level of the image signal and time period of the classification, said classifier permitting class switching only in response to a new image class determination having a predetermined new confidence value for a predetermined time period.

15. The system of claim 14 wherein the vision system comprises a stereo vision system that produces three-dimension image data of the vehicle interior as a stereo disparity map.

* * * * *

UNITED STATES PATENT AND TRADEMARK OFFICE
CERTIFICATE OF CORRECTION

PATENT NO.        : 7,636,479 B2
APPLICATION NO.   : 10/785920
DATED             : December 22, 2009
INVENTOR(S)       : Luo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1702 days.

Signed and Sealed this

Ninth Day of November, 2010

David J. Kappos
*Director of the United States Patent and Trademark Office*